United States Patent
Matei et al.

(10) Patent No.: US 11,594,957 B2
(45) Date of Patent: Feb. 28, 2023

(54) DUAL-STAGE BOOST CONVERTER

(71) Applicant: Apple Inc., Cupertino, CA (US)

(72) Inventors: Bogdan-Eugen Matei, Munich (DE); Cristian Grecu, Munich (DE); Fabio Ongaro, Unterhaching (DE); Giovanni Saccomanno, Munich (DE); Siarhei Meliukh, Munich (DE); Yesim Inam, Munich (DE)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 17/203,567

(22) Filed: Mar. 16, 2021

(65) Prior Publication Data
US 2022/0302826 A1    Sep. 22, 2022

(51) Int. Cl.
*H02M 3/07* (2006.01)
(52) U.S. Cl.
CPC ..................... *H02M 3/07* (2013.01)
(58) Field of Classification Search
CPC ...................................................... H02M 3/07
See application file for complete search history.

(56) References Cited

U.S. PATENT DOCUMENTS

| | | | |
|---|---|---|---|
| 7,292,462 B2 | 11/2007 | Watanabe et al. | |
| 9,595,871 B1* | 3/2017 | Bayer | H02M 3/1582 |
| 9,678,528 B2 | 6/2017 | Ripley | |
| 10,491,112 B2 | 11/2019 | Li | |
| 2008/0157732 A1* | 7/2008 | Williams | H02M 3/1588 |
| | | | 323/266 |
| 2010/0072968 A1* | 3/2010 | Bianco | H02M 3/156 |
| | | | 323/284 |
| 2015/0108961 A1* | 4/2015 | Barlage | H02M 3/156 |
| | | | 257/595 |

* cited by examiner

*Primary Examiner* — Sibin Chen
(74) *Attorney, Agent, or Firm* — Kowert, Hood, Munyon, Rankin & Goetzel, P.C.; Erik A. Heter; Dean M. Munyom

(57) ABSTRACT

A dual-stage boost converter is disclosed. The boost converter includes a charge pump and a boost stage. The charge pump is coupled between an input voltage source and the boost stage. The charge pump is coupled to receive the input voltage and configured to generate an intermediate voltage that is greater than the input voltage received from the input voltage source. The boost stage includes an inductor coupled to receive the intermediate voltage and is configured to generate an output voltage that is greater than or equal to the intermediate voltage.

20 Claims, 8 Drawing Sheets

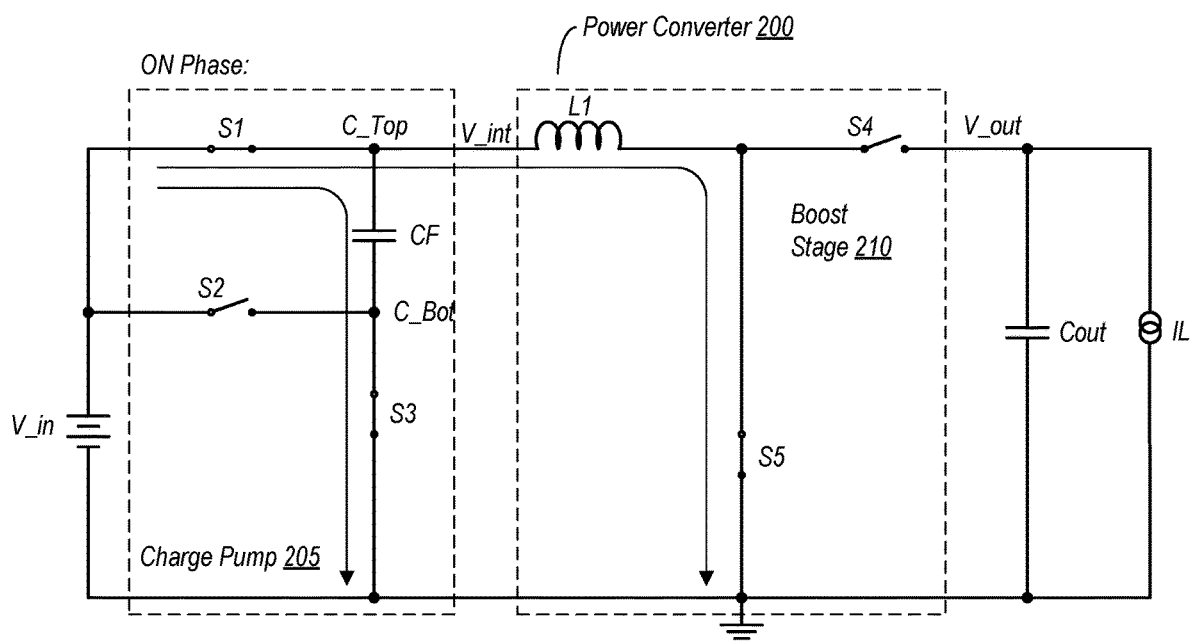
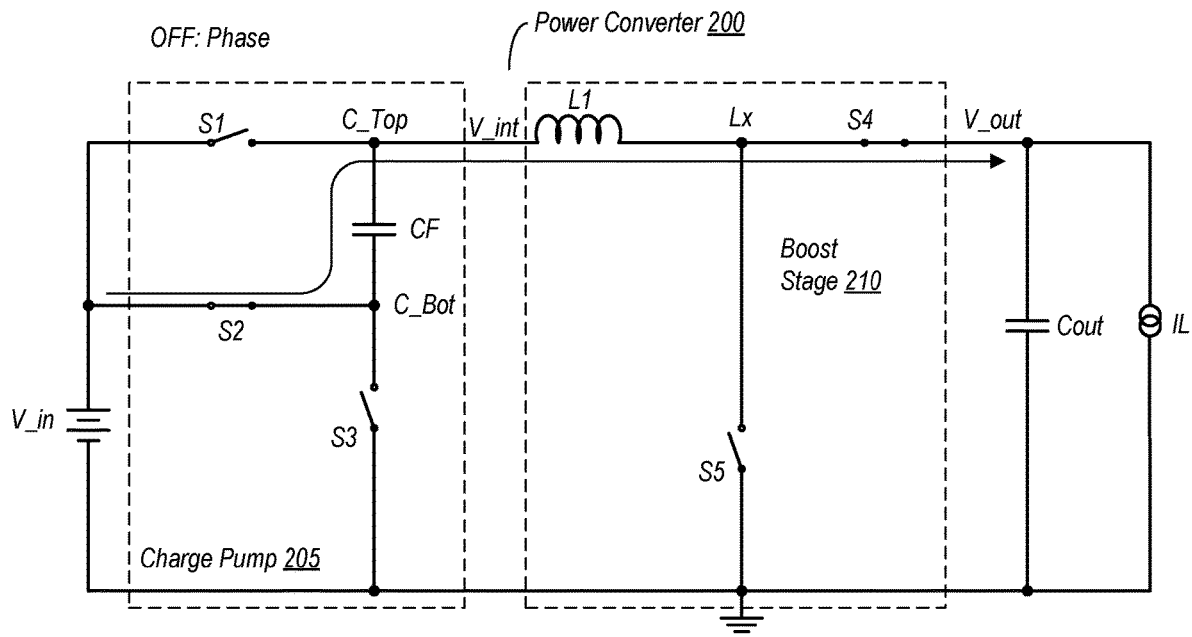
Fig. 3

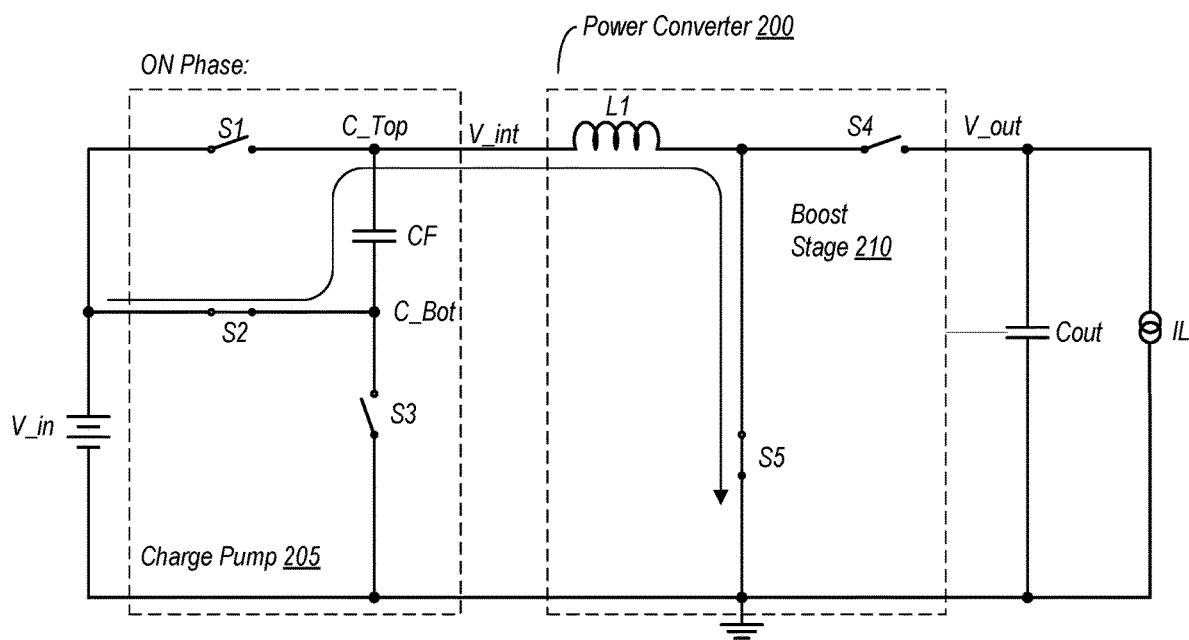
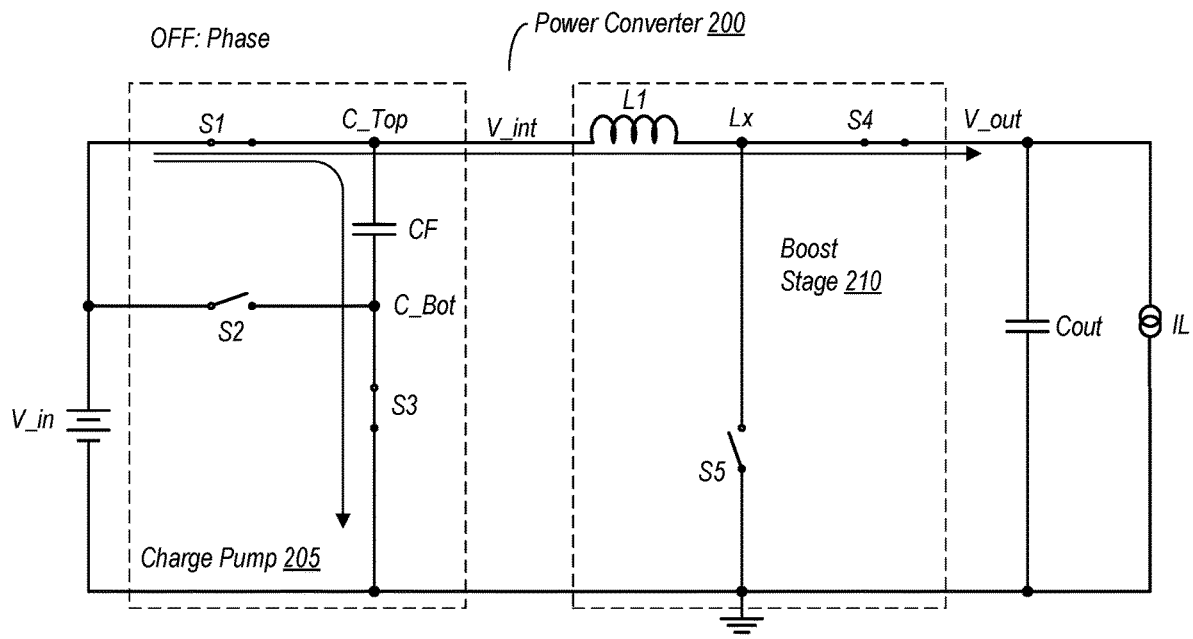
Fig. 4

DUAL-STAGE BOOST CONVERTER

BACKGROUND

Technical Field

This disclosure is directed to power converters, and more particularly, to boost converters.

Description of the Related Art

Switching power converters are well known in the electronic arts. Switching power converters include buck converters, in which the output voltage is less than the input voltage, and boost converters, in which the output voltage is greater than the input voltage. Such switching converters may trade voltage and current in the buck or boost operation, and may provide greater efficiency than linear voltage regulators.

Some switching converter includes a pair of switches (e.g., transistors). One of the switches, when closed, couples an energy storage element (e.g., an inductor) to an input voltage source at a node sometimes referred to as a switching node. Another switch couples the switching node to a ground or reference node. The two switches operate on opposite phases, and thus the status of the switching node alternates between charging and discharging the energy storage element. The voltage across the energy storage element is averaged out (although some ripple may be present) and provided as a regulated DC supply voltage to a load circuit.

SUMMARY

A dual-stage boost converter is disclosed. In one embodiment, a boost converter includes a charge pump and a boost stage. The charge pump is coupled between an input voltage source and the boost stage. The charge pump includes a capacitor, and is coupled to receive the input voltage and generate an intermediate voltage that is greater than the input voltage received from the input voltage source. The boost stage includes an inductor coupled to receive the intermediate voltage, and generates an output voltage that is greater than or equal to the intermediate voltage.

In one embodiment, the dual-stage boost converter is arranged to operate in various modes of operation. In an in-phase mode, the capacitor of the charge pump is charged concurrent with the charging of the inductor. Discharging of the capacitor and inductor is also conducted concurrently during operation in the in-phase mode. In an out-of-phase mode, the capacitor and inductor are charged and discharged in opposite phases with respect to one another.

BRIEF DESCRIPTION OF THE DRAWINGS

The following detailed description makes reference to the accompanying drawings, which are now briefly described.

FIG. 3 is a schematic diagram illustrating operation of one embodiment of a boost converter operating in an in-phase mode.

FIG. 4 is a schematic diagram of one embodiment of a boost converter operating in an out-of-phase mode.

DETAILED DESCRIPTION OF EMBODIMENTS

Figure 1:
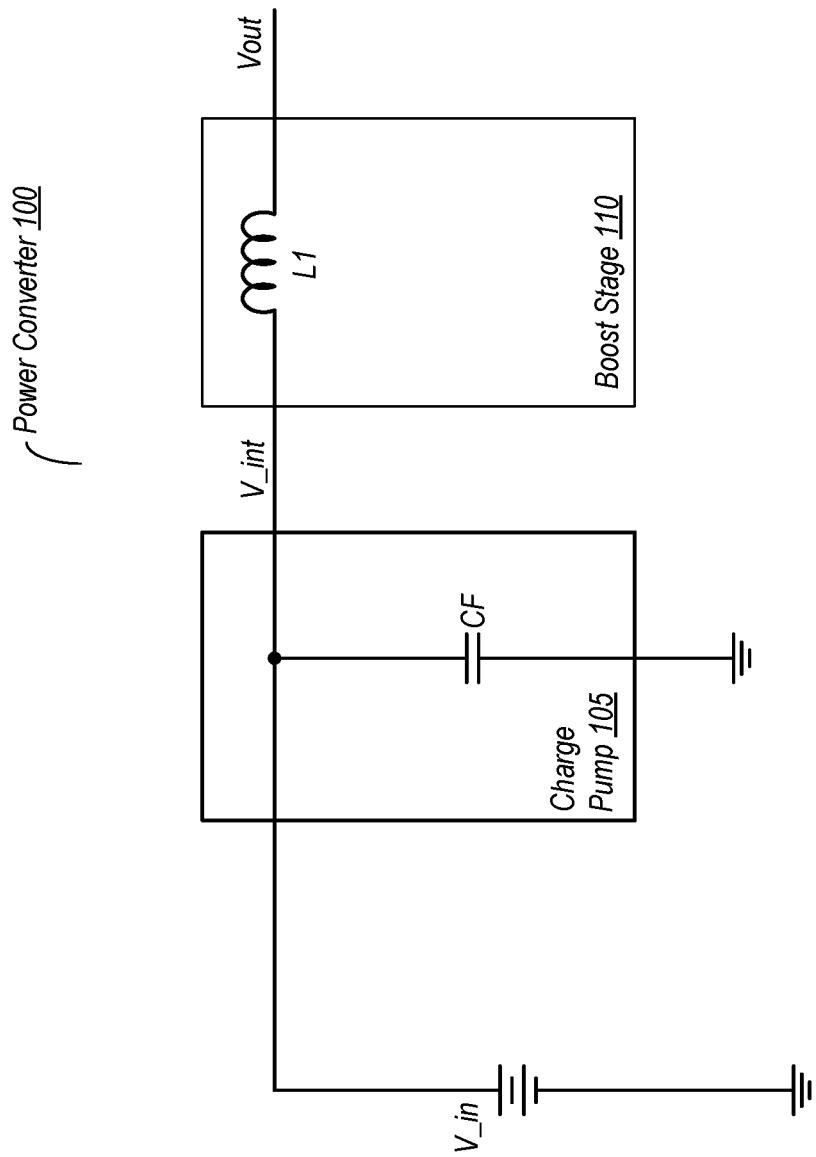
FIG. 1 is a block diagram of one embodiment of a boost converter having a charge pump.

A dual-stage boost converter is disclosed. Boost converters are used in a wide variety of application in which a supply voltage exceeding an available input voltage is desired. One such application is in a display unit of a portable device (e.g., smartphone), in which the input voltage source is a battery. Since the battery may be unable to provide a sufficient voltage level (much less sufficient regulation) for a backlight of a display, a boost converter may be utilized.

While efficiency of a boost converter is important in any application, it is of increased importance in a portable device operating on battery power. In state-of-the-art boost converters, power/efficiency losses have three primary sources: 1) ohmic losses in the inductor of the boost converter; 2) losses in the inductor due to ripple current; and 3) losses in the switches of the boost converter. These losses are detrimental to the battery life of a portable device, as the lost power provides no useful work.

The losses discussed above are dependent on a ratio of the output voltage to the input voltage, which is sometimes referred to as the conversion ratio. The losses can also depend on various inductor parameters and load current demand. For boost converters with a high conversion ratio, average input current is high even when the load current is low, thereby resulting in power/efficiency losses. Using the example of a display backlight comprising a number of LED strings, the load current can be low whenever the display is dimmed. Accordingly, when a boost converter having a high conversion ratio is used to power a display backlight, power may be wasted even when the display is dimmed to a value that is less than its maximum brightness.

The boost converter of the present disclosure makes use of the insight that power/efficiency losses in a boost converter are dependent upon the conversion ratio. In particular, it is noted that with a smaller conversion ratio, the power/efficiency losses may be reduced. Accordingly, the boost converter of the present disclosure implements a charge pump between the input voltage source and the boost stage. The addition of the charge pump thus increases the voltage that is provided to the boost stage, thereby reducing the conversion ratio. This reduced conversion ratio may therefore result in both a lower ripple current in the inductor, and a lower average inductor current. As a result, efficiency of the boost converter disclosed herein is greater than is possible for state-of-the-art boost converters, and may be well-suited for use in portable applications in which efficiency takes on a greater importance.

The charge pump used in the dual-stage boost converter disclosed herein may operate in one of two different modes. The mode of operation may be chosen based on a desired conversion ratio, among other factors. Various embodiments of the dual-stage boost converter and the charge pump thereof are now discussed further herein.

The remainder of the disclosure includes a number of sections, beginning with a discussion of a basic embodiment of the dual-stage boost converter. Discussion of different modes of operation follows. A multi-phase hybrid boost converter that includes at least one instance of an embodiment of a dual-stage boost converter are disclosed, as is an integrated circuit having at least one instance of a dual-stage boost converter implemented thereon. Sections directed to a methodology for operating an embodiment of a dual-stage boost converter and an example of a system in which one may be implemented conclude the detailed description.

Dual Stage Boost Converter:

FIG. 1 is a block diagram of one embodiment of dual-stage boost converter. In the embodiment shown, power converter 100 is a boost converter that includes a charge pump 105 and a boost stage 110. An input voltage source, Vin, is coupled to provide an input voltage to charge pump 105. Charge pump 105 may charge capacitor CF, and with proper sequencing of charge and discharge phase, cause generation of a voltage greater than the input voltage, referred to here as V_int. The V_int node is further coupled to an inductor L1 of boost stage 110. An output voltage, V_out, is provided from the other terminal of the inductor. The output voltage is greater than the input voltage. The intermediate voltage, V_int, may be any voltage greater than the input voltage up to and including the output voltage.

Losses in a boost converter (and thus its efficiency) depend on the ratio of input and output voltages. In the embodiment shown, the use of the charge pump increases the voltage that is input into the inductor. Conversion efficiency is an important parameter in a boost converter, and takes on a heightened importance in portable, battery powered applications in which the conservation of battery power is an important performance metric. Accordingly, by boosting the voltage that is provided to the inductor of boost stage 110, greater conversion efficiency may be attained.

Figure 2:
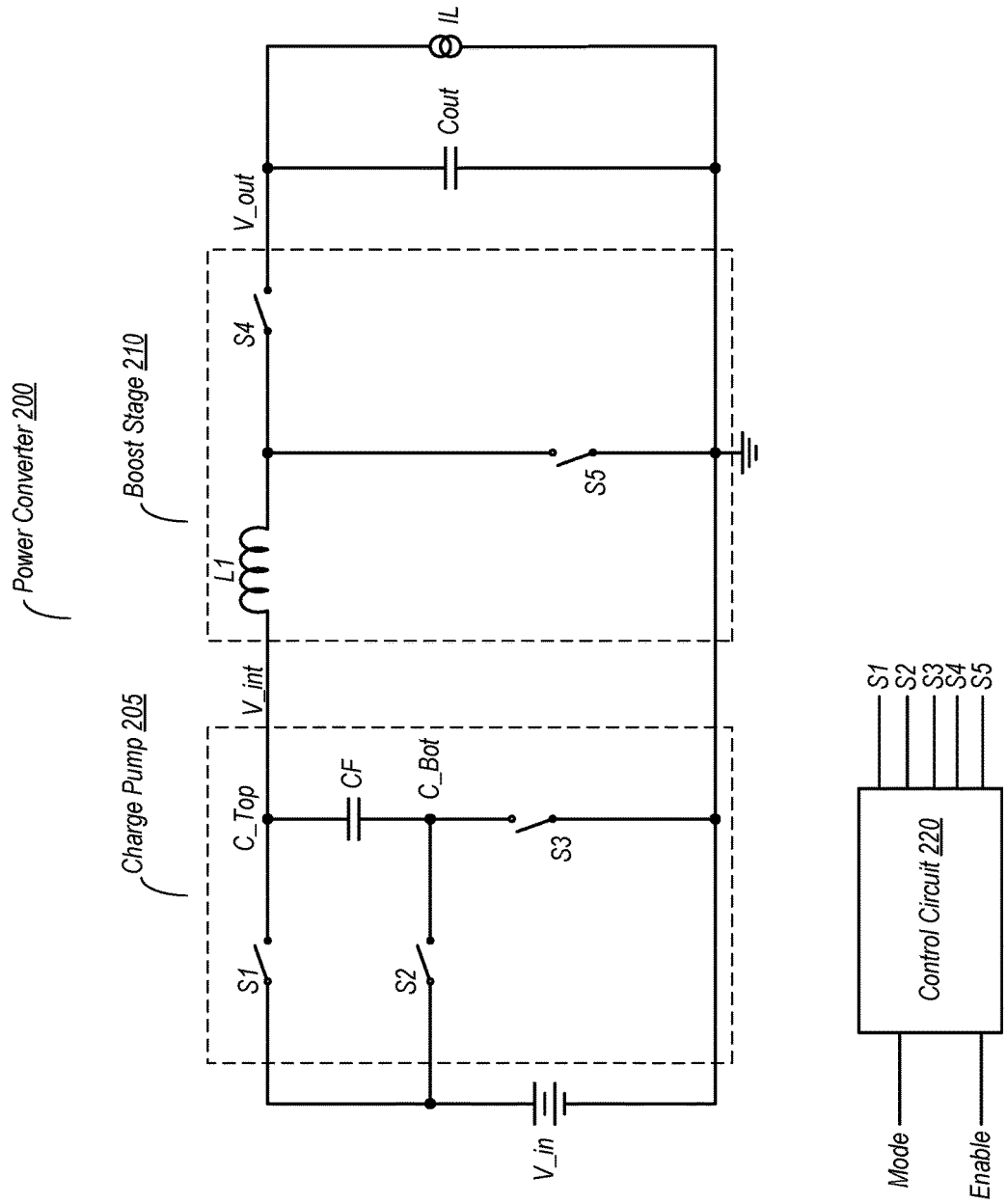
FIG. 2 is a schematic diagram of one embodiment of a boost converter having a charge pump.

FIG. 2 is another embodiment of a dual-stage boost converter. In the embodiment shown, power converter 200 is a boost converter including a charge pump 205 coupled to receive an input voltage V_in from an input voltage source. Charge pump 205 is configured to generate an intermediate voltage, V_int, which may be in accordance with a desired target voltage. In the embodiment shown, the intermediate voltage is greater than the input voltage, V_in, and may be as high as the desired output voltage, V_out. The intermediate voltage is received by boost stage 210, on one terminal of inductor L1. Boost stage 210 is configured to generate an output voltage, V_out, based on the intermediate voltage, V_int. The output voltage is provided to a load circuit, represented here by current source IL. An output capacitor, Cout, is also coupled to boost stage 210.

Charge pump 205 in the embodiment shown includes a capacitor (sometimes referred to as a fly capacitor) CF, and a number of switches. A first switch, S1, is coupled between input voltage source V_in and a first terminal of CF coupled the node C_Top, upon which the intermediate voltage is generated and conveyed. A second switch, S2, is coupled between input voltage source V_in and a second terminal of CF coupled to the node C_bot. A third switch of charge pump 205 is coupled between the node C_bot and a ground node.

Boost stage 210 in the embodiment shown includes inductor L1, which is coupled at a first terminal to receive the intermediate voltage via the node C_Top. A second terminal of inductor L1 is coupled to switches S4 and S5 at the switching node Lx. Switch S4 is coupled between the switching node and an output voltage node upon which V_out is provided. Switch S5 is coupled between the switching node and the ground node.

Switches S1-S5 may be implemented using any suitable device for implementing a switch, including NMOS transistors, PMOS transistors, and so on. Control of the respective states of the switches may be carried out by control circuit 220. In the embodiment shown, control circuit 220 is configured to generate and provide control signals for switches S1-S5. The signals may be generated such that each of the switches can be controlled independently of one another. This may enable multiple modes of operation of power converter 200. Control circuit 220 in the embodiment shown is coupled to receive mode and enable signals (e.g., from a power management circuit) for selecting a desired operational mode and for enabling/disabling operation of power converter 200. During the various modes of operation, control circuit 220 may cause the capacitor of charge pump 205 to be charged. With the sequencing of the switches, a target voltage is generated on the V_int node. The target voltage may be a voltage that is greater than the input voltage, V_in, and may be as high at the desired output voltage, V_out. Generally speaking, charging the intermediate voltage to a value higher than the input voltage may increase the conversion efficiency of operation of boost stage 210.

Operational Modes of a Dual-Stage Boost Converter:

FIG. 3 is a schematic diagram illustrating operation of one embodiment of a power converter in a first mode, referred to here as the in-phase mode. More particularly, FIG. 3 illustrates operation of the embodiment of a boost converter shown in FIG. 2. The mode of operation discussed with reference to FIG. 3 is referred to as an In-Phase mode, as capacitor CF and inductor L1 are charged and discharged in phase with one another.

Operation of power converter 200 includes an ON phase and an OFF phase. The switch positions during the ON phase are shown in Table 1. It is noted that 'ON' corresponds to the switch being closed, while 'OFF' corresponds to the switch being open.

TABLE 1

| Switch | State |
| --- | --- |
| S1 | ON |
| S2 | OFF |
| S3 | ON |
| S4 | OFF |
| S5 | ON |

When switch S1 is closed, the input voltage V_in is coupled to the node C_Top, on a first terminal of capacitor CF. Meanwhile, the second terminal of capacitor CF is coupled to ground through switch S3, which is also closed. Accordingly, the full potential of the input voltage V_in is coupled in parallel with CF during the ON phase of this mode of operation. In the boost stage, switch S4 is open while switch S5 is closed. At node C_Top, the voltage becomes V_in while C_Bot is at ground potential. Inductor L1 is charged (with a positive current ramp) at a voltage drop equal to V_in, while the switching node Lx is at ground potential. In this switch configuration, capacitor CF and inductor L1 are concurrently charged. More particularly, the voltage across capacitor CF rises concurrently with the current in inductor L1.

In the OFF phase of the In-Phase mode, the switch positions change. These positions are shown in Table 2.

TABLE 2

| Switch | State |
| --- | --- |
| S1 | OFF |
| S2 | ON |
| S3 | OFF |
| S4 | ON |
| S5 | OFF |

During the OFF phase of operation in the In-Phase mode, the closing of switch S2 connects V_in to the node C_bot, while the opening of switch S3 decouples this node from ground. Furthermore, switch S5 is also opened, decoupling L1 from the ground node. With S4 closed, inductor L1 is coupled to the load circuit. Accordingly, in the OFF phase of the In-Phase mode, capacitor CF and inductor L1 are concurrently discharged. Furthermore, capacitor CF is discharged through inductor L1. Therefore, as the voltage across capacitor CF falls, the current through inductor L1 falls correspondingly. At this point of the operation, the voltage at C_Top becomes 2V_in, while the voltage at C_Bot is Vin. The switching node Lx is at the potential V_out, while inductor L1 is discharged with a negative current ramp at a voltage drop that is equal to the difference V_out minus 2V_in.

Power converter 200 is also configured in the embodiment shown to operate in an Out-of-Phase mode, as shown in FIG. 4. In the Out-of-Phase mode, the capacitor and inductor charge and discharge on opposite phases. The Out-of-Phase mode also includes an ON phase and an OFF phase. The ON phase for the Out-of-Phase mode includes the switch positions listed below in Table 3.

TABLE 3

| Switch | State |
| --- | --- |
| S1 | OFF |
| S2 | ON |
| S3 | OFF |
| S4 | OFF |
| S5 | ON |

With switch S2 on and switches S1 and S3 off, the voltage across capacitor CF is the difference between V_int and V_in. With switch S4 open and switch S5 closed in this configuration, inductor L1 is charged while capacitor CF is discharged. In the ON phase of this mode, the voltage at C_Top becomes 2*Vin and the voltage at C_Bot becomes Vin. Capacitor CF thus supplies the inductor current. Node C_Top becomes equal to 2V_in while node C_bot becomes equal to Vin. The switching node Lx is at ground potential, and inductor L1 is charged with a positive current ramp at a voltage drop equal to 2V_in.

For the OFF phase of the Out-of-Phase mode, the switch positions are listed below in Table 4.

TABLE 4

| Switch | State |
| --- | --- |
| S1 | ON |
| S2 | OFF |
| S3 | ON |
| S4 | ON |
| S5 | OFF |

With switches S1 and S3 on while switch S2 is off, the voltage across capacitor CF becomes V_in. Meanwhile the inductor L1 is coupled to V_out through S4. During the OFF phase of this mode, C_Top is at a voltage potential of V_in and C_Bot is at ground potential, with capacitor CF being charged to a value of V_in. Meanwhile, the switching node Lx is at a potential of V_out, with a voltage drop across inductor L1 equal to the difference of V_out minus V_in. Inductor L1 is discharged while capacitor CF is charged.

Both of the operational modes discussed above may provide certain advantages over prior art boost converter architectures. In particular, both modes may result in a reduction of average inductor current. Furthermore, the In-Phase mode may be particularly effective in reducing current ripple that occurs in the operation of switching converters.

Figure 5:
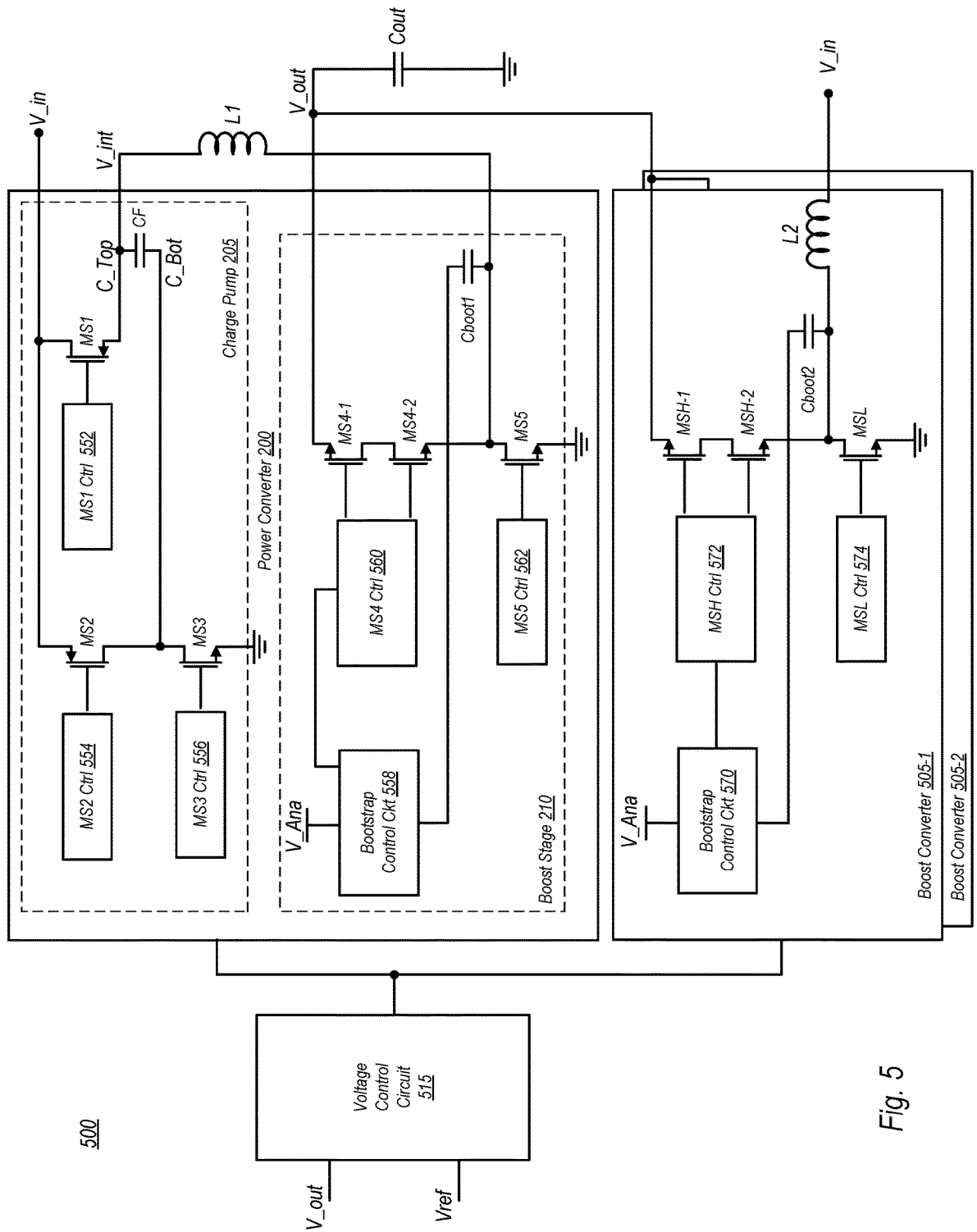
FIG. 5 is a schematic diagram of one embodiment of a hybrid boost converter.

Hybrid, Multi-Phase Boost Converter and Integrated Circuit:

FIG. 5 is a diagram illustrating one embodiment of a multi-phase hybrid boost converter. In the embodiment shown, hybrid boost converter 500 includes an instance of an embodiment of power converter 300 as discussed above, as well as additional instances of a boost converter 505. In this embodiment, boost converter 505-1 and 505-2 are present. In various embodiments, additional instances of a boost converter 505 may be present, as well as having only a single instance thereof. In some embodiments, one or more instances of boost converter 505 may be replaced by an instance of power converter 200.

In the embodiment shown, transistors MS1-MS5 as shown here implement switches S1-S5 of FIGS. 2-4, respectively, with MS4-1 and MS4-2 implementing S4. The various control circuits coupled to the gate terminal of corresponding transistor (e.g., MS1 control circuit 552) may be part of a consolidated control circuit, such as control circuit 220 of FIG. 2.

In the embodiment shown, power converter 500 implements bootstrapping in boost stage 210. More particularly, instead of using one or more PMOS transistors for the high side switch, NMOS devices are used instead. Accordingly, the voltage on the gate terminals of MS4-1 and MS4-2 are driven to voltages greater than either of V_out or V_in. In the embodiment shown, bootstrap control circuit 558 is coupled to receive a supply voltage from, e.g., an analog voltage supply, V_ana. A bootstrap capacitor, Cboot1, is coupled between the drain terminal of MS5 and bootstrap control circuit 558.

In the boost converters 505, the input voltage V_in is received through an inductor. For the sake of illustration, only the structure of boost converter 505-1 is shown, although it can be assumed that for some embodiments, the structure of boost converter 505-2 is identical. Similar to power converter 200, boost converter 505-1 is configured for bootstrapping operation, and thus the high side switch is implemented using transistors MSH-1 and MSH-2, under the control of MSH control circuit 572. Bootstrap control circuit 570 in the embodiment shown is also coupled to receive the supply voltage V_ana, and provides the sufficient voltage to the gate terminals of NMOS transistors MSH-1 and MSH-2 when activating them.

A low side switch implemented using transistor MSL, is controlled by MSL control circuit 574. A bootstrap capacitor, C_boot2, is coupled between the drain terminal of MSL and bootstrap control circuit 570.

Power converter 500 also includes a voltage control circuit 515, which is coupled to receive the output voltage, V_out, and a reference voltage, Vref. The reference voltage may correspond to a desired output voltage. Based on the difference between these two voltages, voltage control circuit 515 may provide various control signals to ones of the boost converter. In one embodiment, voltage control circuit 515 may activate power converter 200 for low power operations, e.g., when current demand from a load circuit is lower. In this manner, power converter may provide increased efficiency at lower currents, where efficiency requirements are stricter. For higher current demands, boost converters 505-1 and 505-2 may be activated, as efficiency requirements may be more relaxed.

Figure 6:
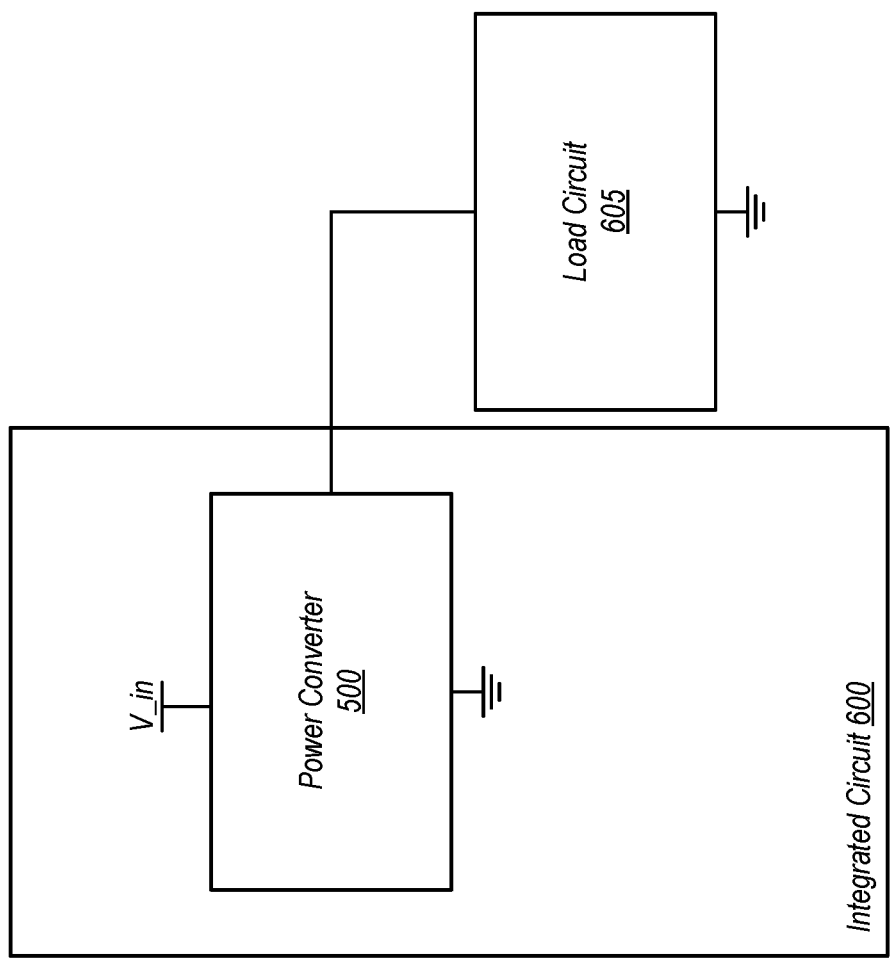
FIG. 6 is a block diagram of one embodiment of an integrated circuit.

FIG. 6 is a block converter of one embodiment of an integrated circuit having a power converter implemented thereon, with the power converter being coupled to a load circuit. In the embodiment shown, power converter 500 may be an embodiment of a power converter similar to the one discussed above with reference to FIG. 5. Embodiments are also possible and contemplated in which an instance of a power converter 100 or 200, as discussed above in reference to FIGS. 1-4, may also implemented on an integrated circuit separate and independent of a power converter such as power converter 500.

Load circuit 605 in the embodiment shown is implemented off-chip, although embodiments in which power converter 500 and load circuit 605 are implemented on the same integrated circuit die are possible and contemplated. The load circuit 605 may be any suitable circuit having power requirements conforming to those which power converter 500 can provide. For example, load circuit may, in one embodiment, be a display backlight having a number of LED (light emitting diode) strings, among other possibilities.

Figure 7:
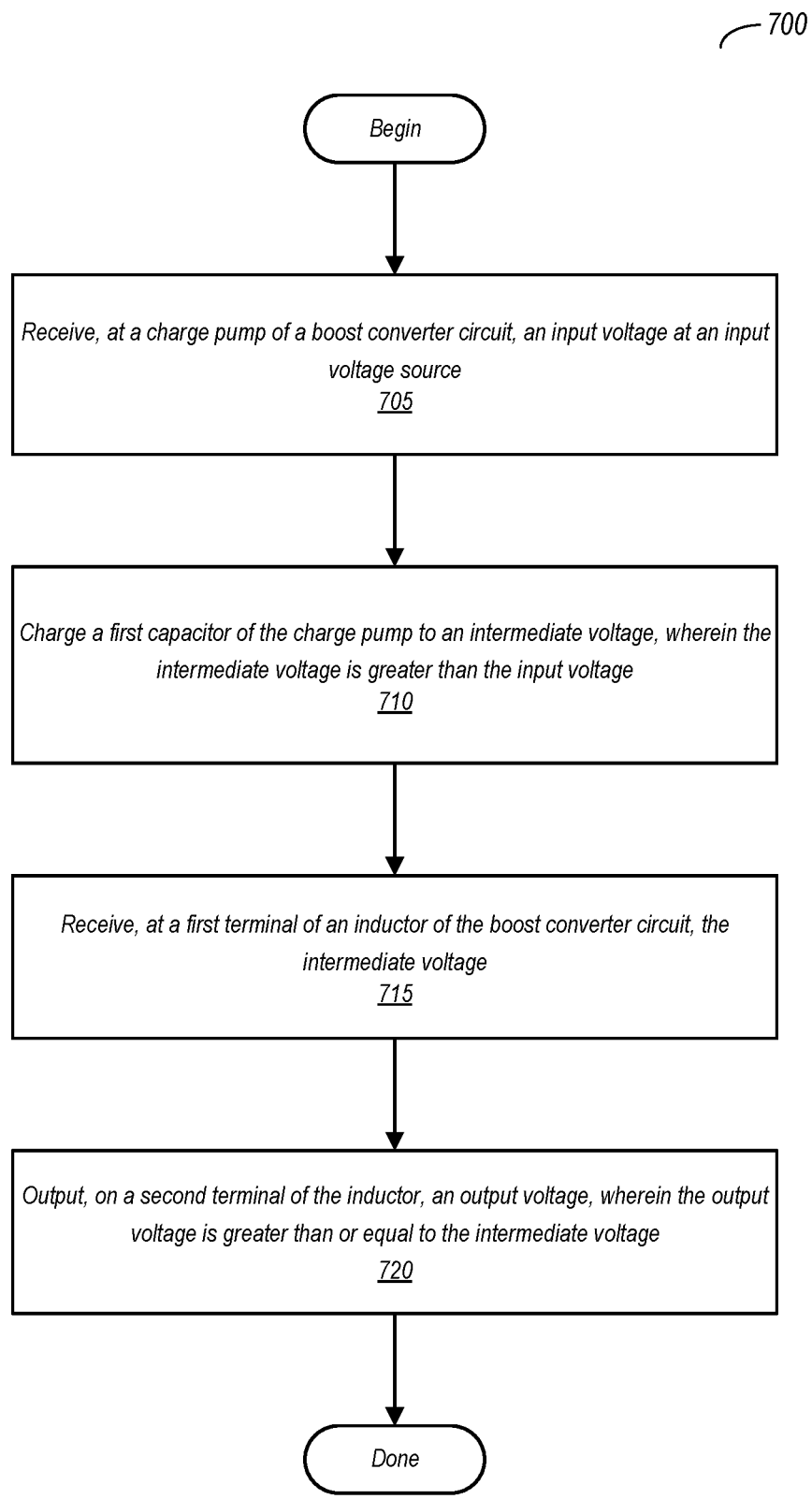
FIG. 7 is a flow diagram illustrating one embodiment of a method for operating a boost converter.

Method for Operating a Dual-Stage Boost Converter:

FIG. 7 is a flow diagram of one embodiment of a method for operating a dual-stage boost converter. Method 700 may be carried out by various embodiments of the boost converters discussed above in reference to FIGS. 1-6. Additionally, various embodiments of a boost converter capable of carrying out Method 700, but not otherwise disclosed explicitly herein, are considered to fall within the scope of this disclosure.

Method 700 includes receiving, at a charge pump of a boost converter circuit, an input voltage at an input voltage source (block 705). The method further includes charging a first capacitor of the charge pump to cause generation of an intermediate voltage, wherein the intermediate voltage is greater than the input voltage (block 710). Thereafter, the method includes receiving, at a first terminal of an inductor of the boost converter circuit, the intermediate voltage (block 715) and outputting, on a second terminal of the inductor, an output voltage, wherein the output voltage is greater than or equal to the intermediate voltage (block 720).

In various embodiments, the method further includes operating the boost converter circuit in an in-phase mode. Operation in the in-phase mode includes a control circuit causing charging of the first capacitor to a target voltage concurrent with charging the inductor to a target current during a first phase, wherein the target voltage is provided as the intermediate voltage. Operation in the in-phase mode further includes the control circuit causing discharging of the first capacitor and the inductor during a second phase.

In some embodiments, operating in the in-phase mode also includes closing, during the first phase, a first switch coupled between the input voltage source and the first terminal of the inductor, wherein the first terminal of the inductor is coupled to a first terminal of the capacitor. This may be followed by opening a second switch coupled between the input voltage source and a second terminal of the capacitor closing a third switch coupled between the second terminal of the capacitor and a ground node. Operating in the in-phase mode also includes discharging the capacitor through the inductor during the second phase, wherein discharging the capacitor through the inductor comprises closing the second switch and opening the first and third switches.

Various embodiments of the method also include operating the boost converter circuit in an out-of-phase mode. Operating in the out-of-phase mode includes the control circuit causing charging of the first capacitor to a target voltage concurrent with discharging the inductor during a first phase, wherein the target voltage is provided as the intermediate voltage, and also includes causing discharging of the first capacitor concurrent with charging of the inductor to a target current during a second phase.

Figure 8:
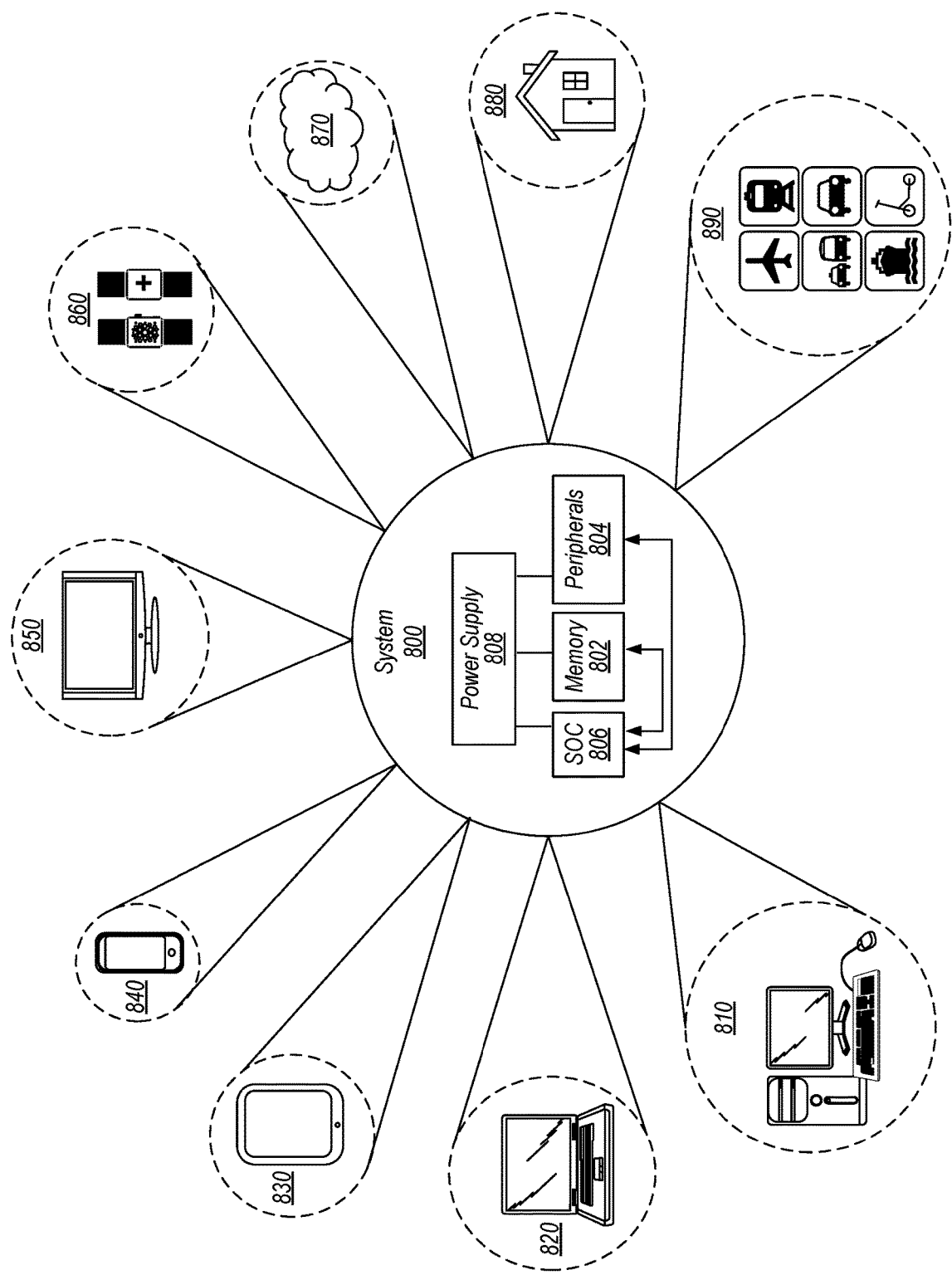
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

In various embodiments of system 800, one or more instances of a dual-stage boost converter may be implemented according to one of the various embodiments discussed above. Such boost converters may be implemented in any portion of the system. Furthermore, one or more instances of a multiphase, hybrid boost converter that includes at least one instance of the dual-stage boost converter of the present disclosure.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices e.g., flip-flops, registers, latches, etc., finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a boost converter coupled to receive an input voltage and configured to generate an output voltage having a value greater than that of the input voltage, wherein the boost converter includes:
a charge pump coupled to receive the input voltage and configured to generate, using a first capacitor, an intermediate voltage having a value greater than that of the input voltage; and
a boost stage having an inductor coupled to receive the intermediate voltage on a first terminal and configured to generate the output voltage, on a second terminal, at a value greater than or equal to the intermediate voltage; and
a control circuit configured to cause the boost converter to operate in one of a first mode or a second mode, wherein the control circuit is configured to cause the first capacitor and the inductor to charge concurrently and discharge concurrently when operating in the first mode.

2. The apparatus of claim 1, wherein the charge pump includes:
a first switch coupled between a source of the input voltage and a first node, wherein the first node is further coupled to a first terminal of the first capacitor and a first terminal of the inductor;
a second switch coupled between the source of the input voltage a second terminal of the first capacitor; and
a third switch coupled between the second terminal of the first capacitor and a ground node.

3. The apparatus of claim 2, wherein the boost converter further includes a fourth switch coupled between a second terminal of the inductor and an output node, a fifth switch coupled between the second terminal of the inductor and the ground node, and a second capacitor coupled between the output node and the ground node.

4. The apparatus of claim 1, wherein the control circuit is configured to cause the first capacitor to charge concurrent with discharging the inductor and cause the first capacitor to discharge concurrent with charging the inductor when operating in the second mode.

5. The apparatus of claim 1, wherein the control circuit is configured to, during operation in the first mode:
cause charging of the first capacitor to cause generation of a target voltage concurrent with charging the inductor to a target current during a first phase; and cause concurrent discharging of the first capacitor and the inductor during a second phase.

6. The apparatus of claim 1, wherein the control circuit is configured to, during operation in the second mode:
cause charging of the first capacitor to cause generation of a target voltage concurrent with discharging the inductor during a first phase; and
cause discharging of the first capacitor concurrent with charging of the inductor to a target current during a second phase.

7. The apparatus of claim 1, wherein the boost converter is a multi-phase boost converter, wherein a first phase of the multi-phase boost converter includes the charge pump and the boost stage and wherein a second phase of the multi-phase boost converter includes an additional boost stage configured to operate independently of the first phase.

8. The apparatus of claim 1, wherein the boost converter includes a bootstrap circuit configured to drive a gate voltage of a high side switch to a voltage value that is greater than a value of the output voltage.

9. A method comprising:
receiving, at a charge pump of a boost converter circuit, an input voltage at an input voltage source;
charging a first capacitor of the charge pump to cause generation of an intermediate voltage, wherein the intermediate voltage is greater than the input voltage;
receiving, at a first terminal of an inductor of the boost converter circuit, the intermediate voltage; and
outputting, on a second terminal of the inductor, an output voltage, wherein the output voltage is greater than or equal to the intermediate voltage;
wherein the method further comprises operating the boost converter in an in-phase mode including charging, using a control circuit, the first capacitor to cause generation of a target voltage concurrent with charging the inductor to a target current during a first phase, wherein the target voltage is provided as the intermediate voltage and discharging, using the control circuit, the first capacitor and the inductor during a second phase.

10. The method of claim 9, wherein operating in the in-phase mode further comprises:
closing, during the first phase, a first switch coupled between the input voltage source and the first terminal of the inductor, wherein the first terminal of the inductor is coupled to a first terminal of the first capacitor;
opening a second switch coupled between the input voltage source and a second terminal of the first capacitor; and
closing a third switch coupled between the second terminal of the first capacitor and a ground node.

11. The method of claim 10, wherein operating in the in-phase mode further comprises discharging the first capacitor through the inductor during the second phase, wherein discharging the first capacitor through the inductor comprises closing the second switch and opening the first and third switches.

12. The method of claim 10, wherein closing the first switch comprises a bootstrap circuit driving a gate terminal of the first switch to a value greater than the output voltage.

13. The method of claim 9, further comprising operating the boost converter circuit in an out-of-phase mode, wherein operating in the out-of-phase mode comprises:
a control circuit causing charging of the first capacitor to cause generation of a target voltage concurrent with discharging the inductor during a first phase, wherein the target voltage is provided as the intermediate voltage; and
the control circuit causing discharging of the first capacitor concurrent with charging of the inductor to a target current during a second phase.

14. A system comprising:
a multi-phase power converter coupled to receive an input voltage from an input voltage source and configured to provide an output voltage, wherein the multi-phase power converter includes a first boost converter and a second boost converter coupled to provide the output voltage on a common output voltage node, wherein the first boost converter includes:
a charge pump coupled to receive the input voltage and configured to generate, using a capacitor, an intermediate voltage having a value greater than that of the input voltage, wherein the charge pump includes a first switch coupled between the input voltage a first terminal of the capacitor and a second switch coupled between the input voltage and a second terminal of the capacitor;
a boost stage including a first inductor having a first terminal coupled to the capacitor and a second terminal coupled to a switching node, wherein the boost stage is coupled to receive the intermediate voltage and configured to generate the output voltage, on a second terminal, at a value greater than or equal to the intermediate voltage; and
a control circuit configured to cause the first boost converter to operate in a first mode, wherein operating in the first mode includes the control circuit causing the capacitor and the first inductor to charge concurrently with one another during a first phase and discharge concurrently with one another during a second phase.

15. The system of claim 14, wherein the second boost converter includes a second inductor directly coupled to the input voltage source.

16. The system of claim 14, wherein the first boost converter includes a third switch coupled between the capacitor and a ground node.

17. The system of claim 14, wherein the control circuit is further configured to:
cause the first boost converter to operate in a second mode, wherein operating in the second mode includes the control circuit causing the capacitor and the first inductor to charge and discharge on opposite phases with respect to one another.

18. The system of claim 14, wherein the first boost converter includes a first high side switch and a first low side switch, wherein the second boost converter includes a second high side switch and a second low side switch, and wherein the first and second high side switches and the first and second low side switches are implemented using NMOS devices.

19. The system of claim 18, wherein the first and second boost converters includes first and second bootstrap circuits, respectively, wherein the first and second bootstraps circuits are configured to drive a gate voltage of the first and second high side switches, respectively, to a voltage value greater than a value of the output voltage.

20. The system of claim 14, further comprising a voltage control circuit configured to control activation of the first boost converter and the second converter based on a current value of the output voltage and a reference voltage.

* * * * *